Oct. 6, 1931.   A. TROSCH   1,825,684
MILLING MACHINE
Filed July 26, 1928   5 Sheets-Sheet 2

INVENTOR
Alfred Trosch
BY Harold E. Stonebraker
his ATTORNEY

Oct. 6, 1931.  A. TROSCH  1,825,684
MILLING MACHINE
Filed July 26, 1928    5 Sheets-Sheet 4

INVENTOR
Alfred Trosch
BY
Harold E. Stonebraker
HIS ATTORNEY

Oct. 6, 1931.  A. TROSCH  1,825,684
MILLING MACHINE
Filed July 26, 1928   5 Sheets-Sheet 5

INVENTOR
Alfred Trosch
BY Harold E. Stonebraker
his ATTORNEY

Patented Oct. 6, 1931

1,825,684

UNITED STATES PATENT OFFICE

ALFRED TROSCH, OF ROCHESTER, NEW YORK, ASSIGNOR TO CONSOLIDATED MACHINE TOOL CORPORATION OF AMERICA, OF ROCHESTER, NEW YORK, A CORPORATION OF DELAWARE

MILLING MACHINE

Application filed July 26, 1928. Serial No. 295,540.

This invention relates to a machine tool, and more particularly to a milling machine such for instance as the type in which a work supporting table is reciprocated with reference to milling tools, and in which the tools and work feeding instrumentalities are operated by separate and independent electric motors, and one of the objects of the invention is to afford a practicable and efficient structure that will protect the tools by preventing movement of the work into contact with the tools when the latter are not in motion.

In a more particular aspect, the invention has for its object to provide intercontrolling instrumentalities between the separate electric motors, functioning in such a manner that movement of the work feeding motor cannot be initiated until the tool motor is in operation and also such that upon the opening of the tool motor circuit and stopping the tool motor, the work feed motor is automatically stopped either simultaneously with the tool motor or slightly in advance thereof, thereby effectively preventing movement of the work into engagement with a tool at any time when a tool is stationary.

To these ends, the invention comprises the construction and arrangement that will appear from the following description when read in conjunction with the accompanying drawings, the novel features being pointed out in the claims following the description.

In the drawings:

Figure 6 is a diagrammatic view of the circuit for controlling the electric motors.

Figure 1:
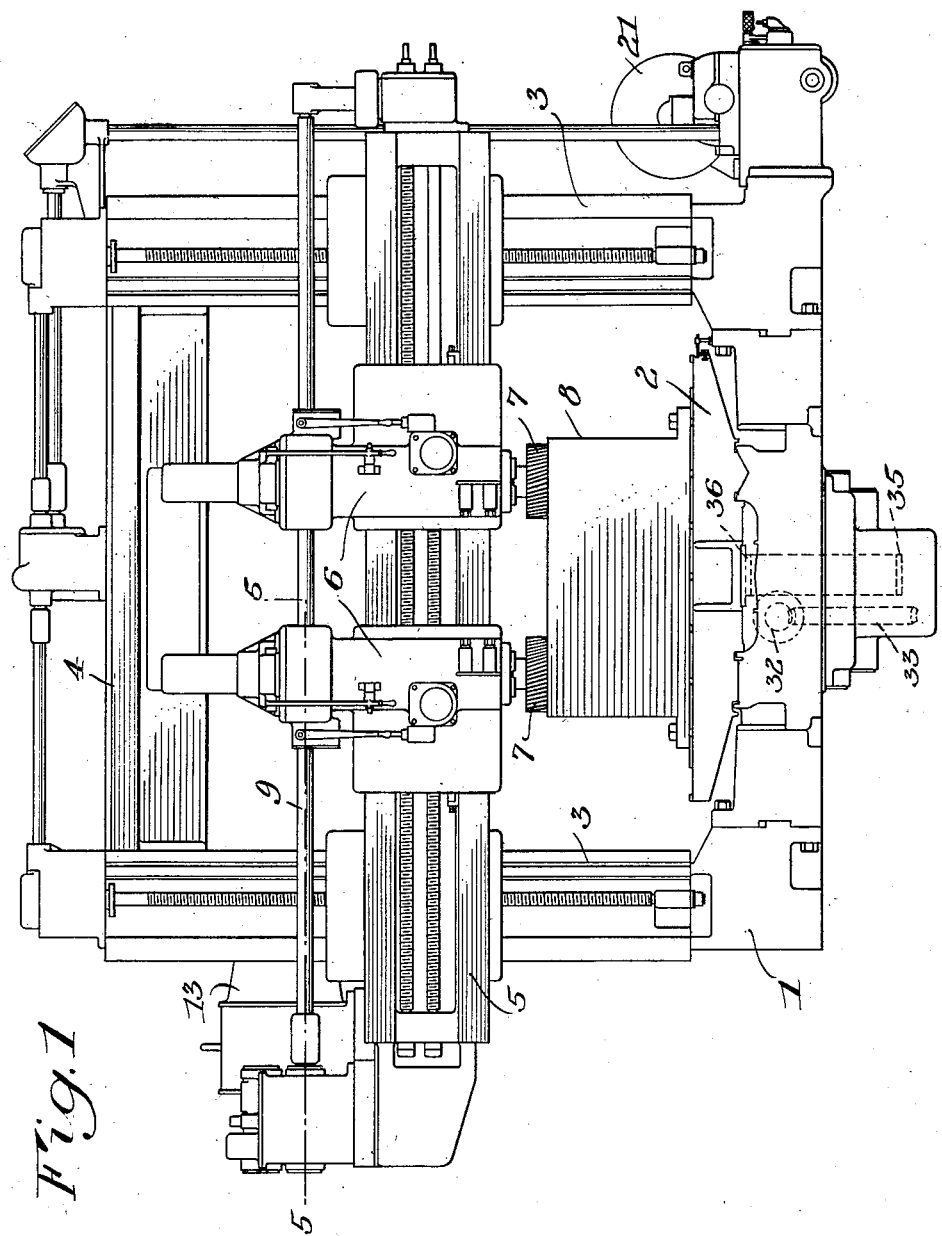
Figure 1 is an end elevation of a planer type milling machine incorporating one embodiment of the invention.

In the arrangement illustrated, 1 designates the bed of the machine, 2 is the reciprocating table or work carrier, 3 are uprights connected at the top by a cross-head 4, while 5 is a cross-rail adjustable vertically on the uprights 3 and having mounted thereon tool heads 6 carrying the rotary tools 7 for cooperation with the work piece 8 as the table 2 is reciprocated.

Figure 5:
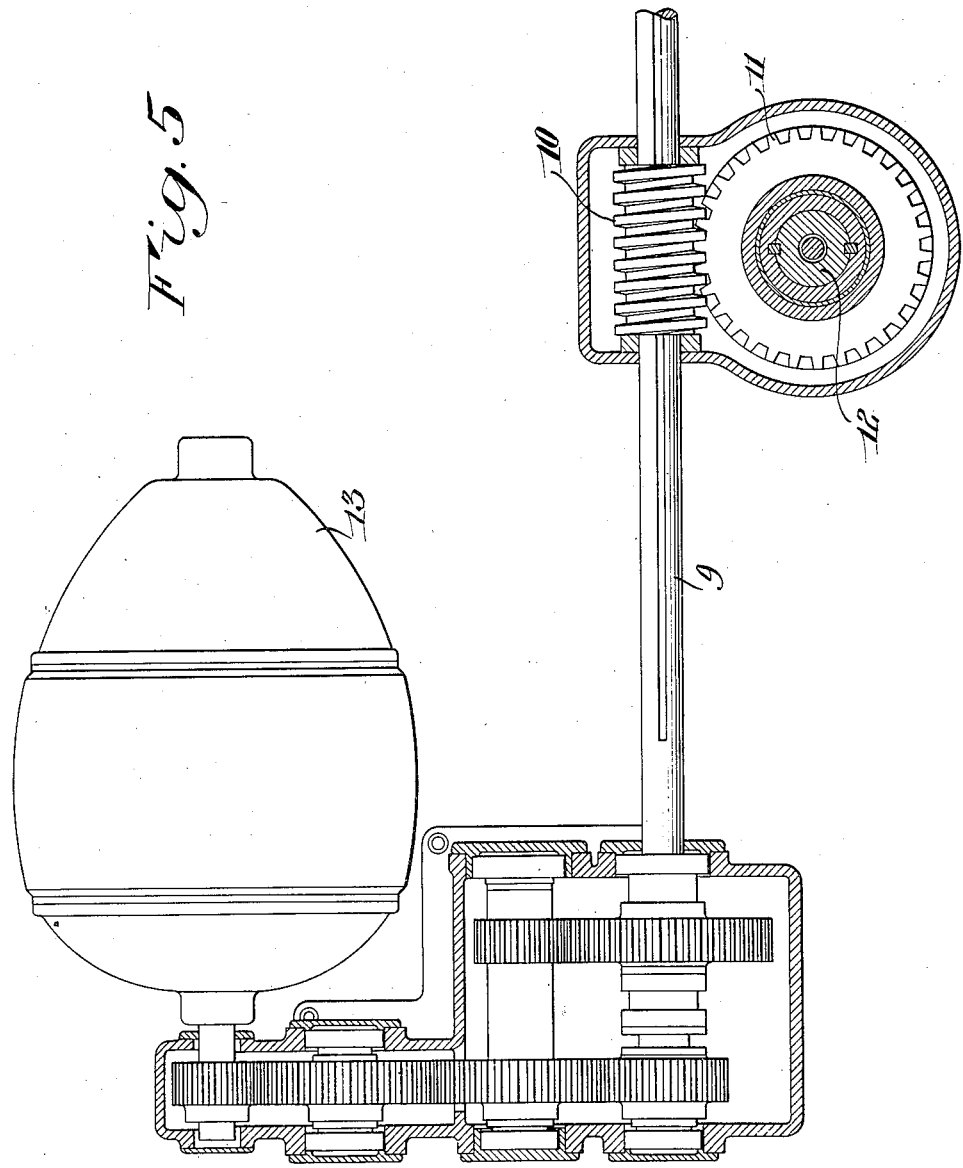
Figure 5 is a horizontal sectional view on line 5—5 of Figure 1.

It will be understood that either one or both tools may be operated, these being driven from a shaft 9 carrying worms 10 which engage and operate worm gears 11 fixed on the vertical spindles 12 that carry the tools. The shaft 9 is operated through suitable gearing such as shown in Figure 5 from an electric tool motor 13, said motor 13 serving to drive the one or more tools which are used on the machine.

Figure 2:
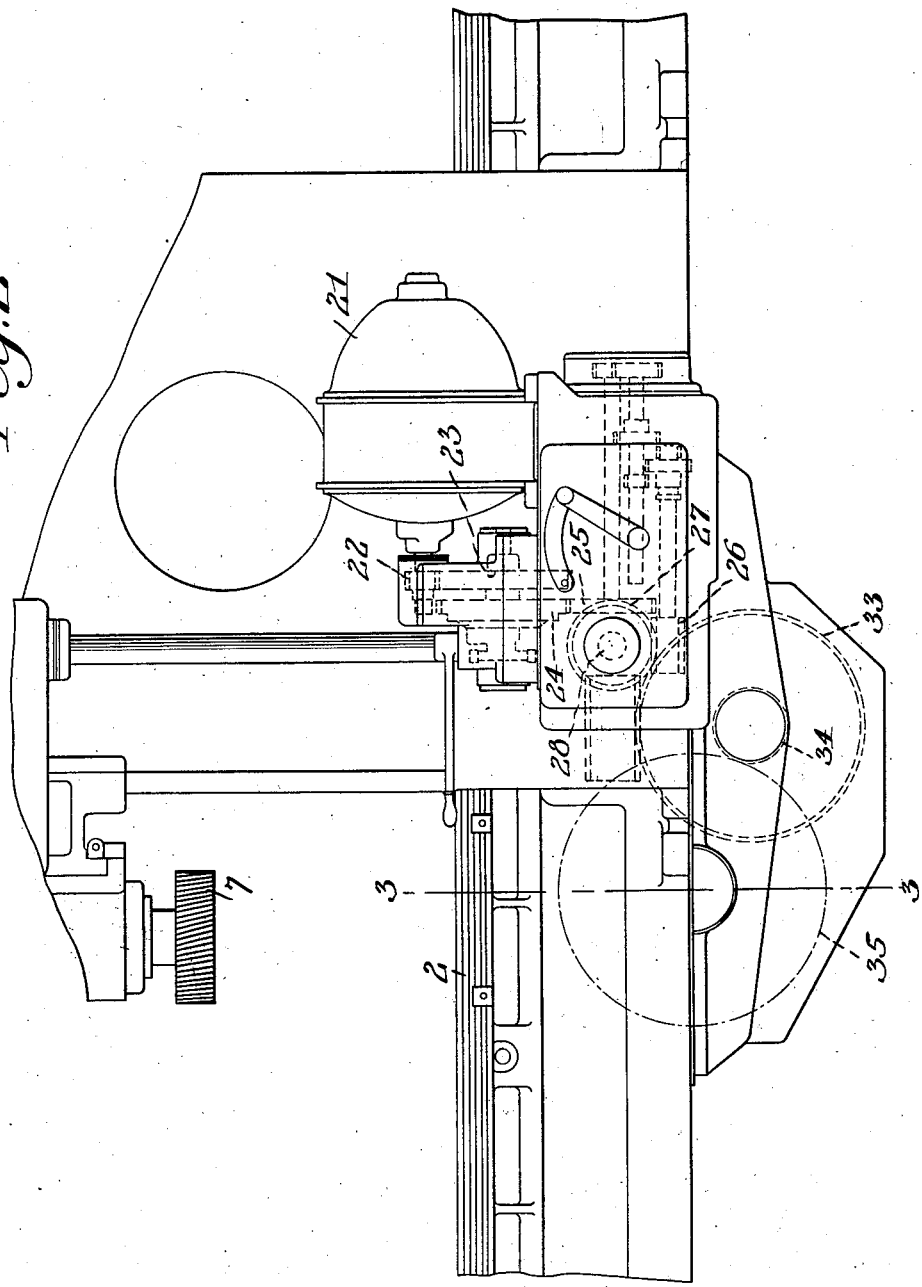
Figure 2 is an enlarged side elevation with parts broken away.
Figure 3:
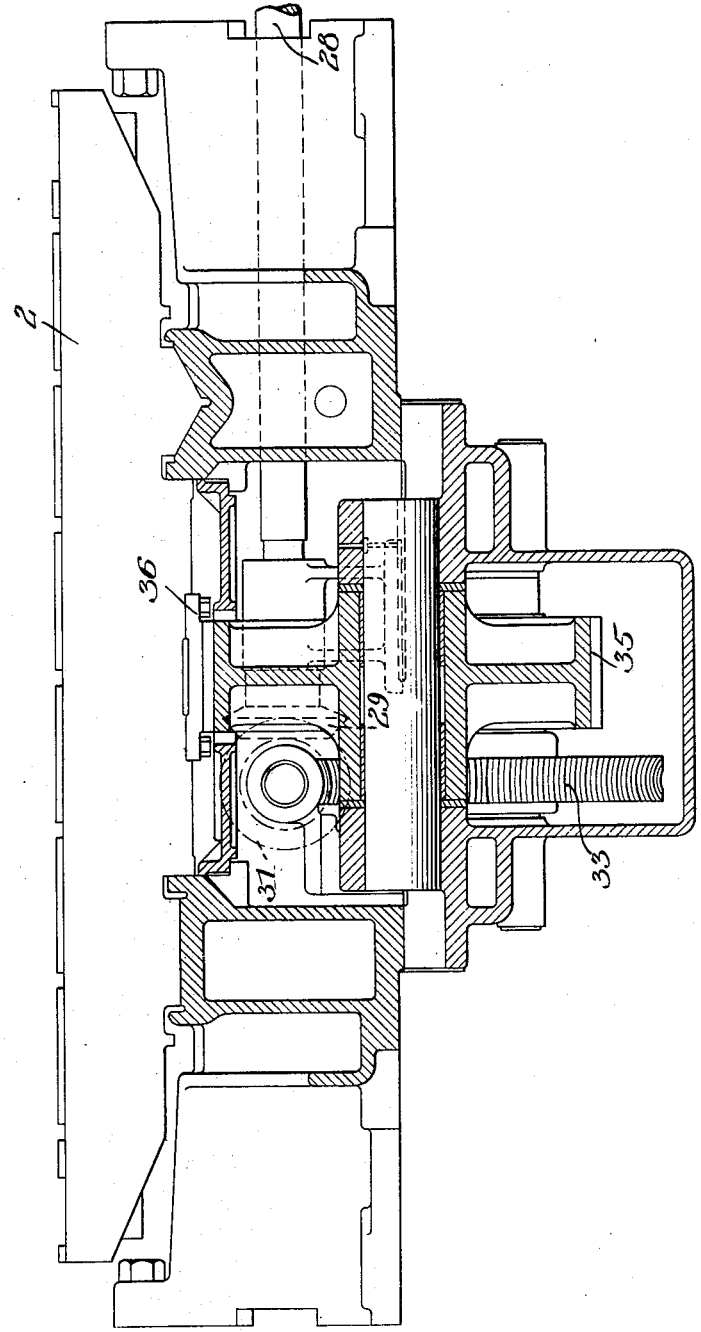
Figure 3 is a transverse vertical sectional view taken substantially on line 3—3 of Figure 2.
Figure 4:
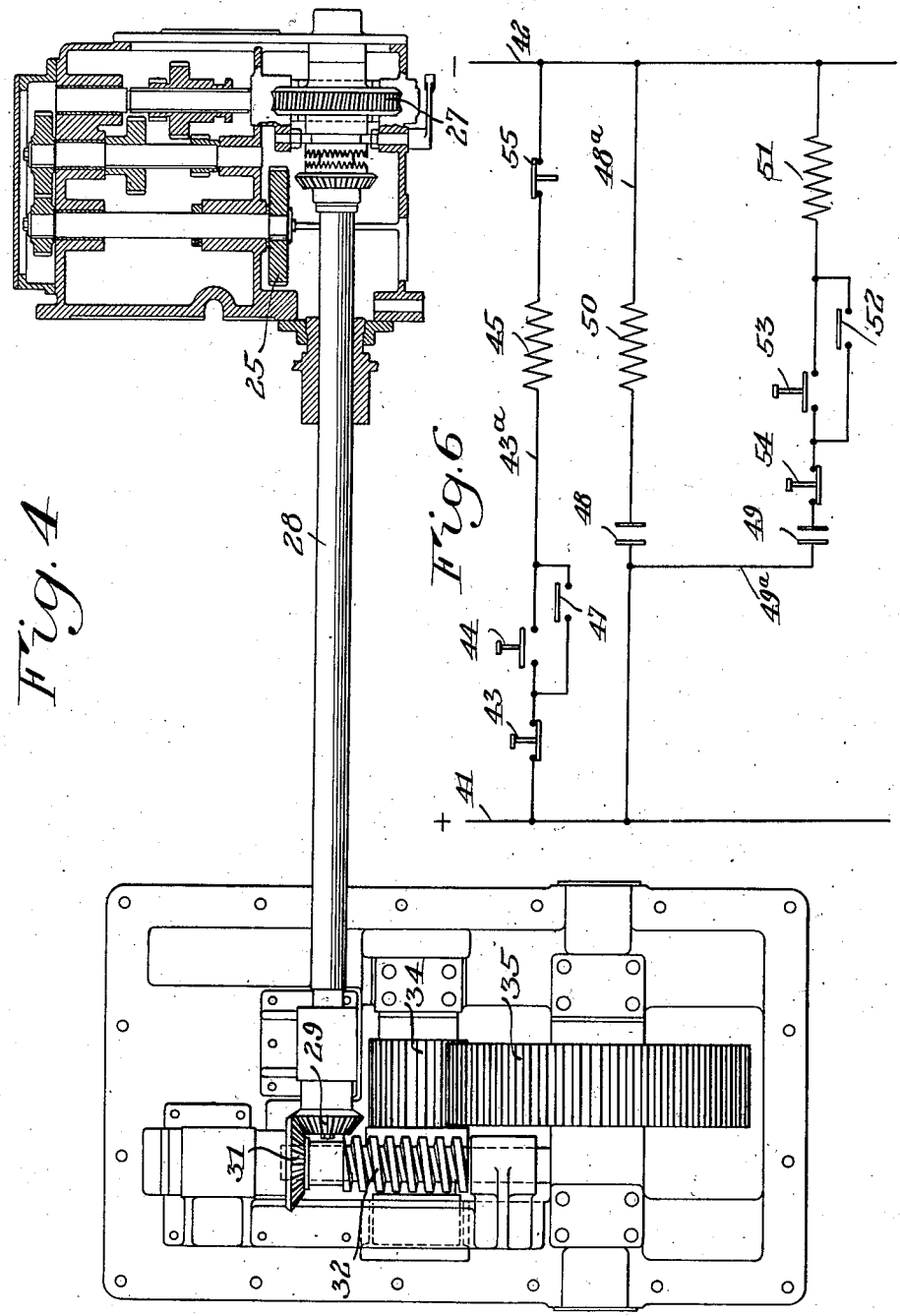
Figure 4 is a horizontal sectional view with parts in elevation, showing the mechanism for driving the reciprocating work supporting table.

The work table 2 is driven from an electric work feed motor 21, see Figure 2, which drives pinion 22, gears 23 and 24, and gear 25, and thence through the change gears illustrated in Figure 4 to a worm 26 and worm gear 27 which latter is on the shaft 28. Shaft 28 carries bevel pinion 29 engaging bevel pinion 31 which is fixed on an arbor that carries worm 32, see Figure 4. The worm 32 engages and drives worm gear 33 mounted on a shaft that also has fixed thereon pinion 34 which engages the main driving gear 35, the latter having engagement with the rack 36 secured to the underside of the work carrier or table. The direction of movement of the work table is changed to effect the necessary reciprocation by any convention mechanism as well known in this art.

It will be seen from the structure thus far described that the electric motor 13 imparts the necessary rotational movement to the tool or tools while motor 21 effects the necessary feeding movement of the work. These motors are related and intercontrolled electrically as shown in Figure 6, and as will now be described.

41 and 42 designate the positive and negative sides of the main circuit controlling both the tool and work feed mechanism motors, which are not indicated in this view, 43 is a stop switch in conductor 43ª, 44 is a starting switch and 45 is a relay coil which controls a contact 47 and relay controlled contacts 48 and 49 located in conductors 48ª and 49ª respectively. 50 designates a tool motor coil which when energized drives the tool motor 13, while 51 is a feed motor coil which when energized drives the work feeding motor 21. 52 is a contact controlled by the coil 51, 53 is a starting switch, and 54 is a stop switch for the feed motor, while 55 is an overload relay contact.

Assuming the parts in the position shown in Figure 6, when it is desired to start the motors, starting switch 44 is closed which energizes coil 45, thereby closing the contact 47 which is held closed and maintains the circuit as long as coil 45 is energized. At the same time, coil 45 closes relay contacts 48 and 49, and upon such closing of the contact 48, tool motor coil 50 is energized and causes the tool motor 13 to operate. The work feed motor, which is controlled by coil 51 cannot operate however until starting switch 53 is closed by a second manual operation. After this is done, coil 51 starts the feed motor 21 and at the same time closes the contact 52 which maintains said circuit closed until a further switch operation is effected. It will be noted that when the shunted switches 44 and 53 have been closed to energize the solenoid coil 45 and the feed motor coil 51, the switches 47 and 52 are also closed and maintain the circuits through the coils, even though the switches are again opened.

The work feed motor 21, which is controlled by coil 51, can be stopped at any time by opening a stop switch 54, without interfering with the tool motor operation, but if the tool motor is stopped, either by an overload breaking contact 55, or by opening the stop switch 43, automatically coil 51 is deenergized and thereby stops the feed motor 21. When the stop switch 43 is opened, or the overload contact 55 is opened, coil 45 is immediately deenergized, causing relay contact 49 to open at the same time that contact 48 opens. When contact 49 opens, coil 51 is deenergized, so that it is impossible to stop the tool motor without simultaneously stopping the feed motor.

From the arrangement described, it will be seen that the feed motor cannot be started until after the tool motor is in operation and that if the tool motor stops, either from overload or from a manual switch operation, the feed motor is automatically stopped at the same time or slightly in advance thereof, while the intercontrol is such as to permit selective stopping and starting of the feed motor as desired, without interfering with the continuous operation of the tool motor.

It is to be understood that the invention is not restricted to the details of construction herein set forth, and this application is intended to cover such modifications or other adaptations of the improvement as properly come within the intent of the improvements or the scope of the following claims.

I claim:

1. The combination with a rotary tool of a milling machine and an electric motor therefor, of work feeding mechanism, an independent electric motor operating the work feeding mechanism, and means controlling said motors whereby stopping the tool motor automatically causes the work feeding motor to stop simultaneously with the tool motor.

2. The combination with a rotary tool of a milling machine and an electric motor therefor, of work feeding mechanism, an independent electric motor operating the work feeding mechanism, and intercontrolling means controlling said motors whereby the work feeding motor cannot be started until the tool motor is in operation.

3. The combination with a rotary tool of a milling machine and an electric motor therefor, of work feeding mechanism, an independent electric motor operating the work feeding mechanism, and means controlling said motors and causing them to cooperate so as to prevent operation of the feed motor until the tool motor is in operation and to automatically stop the feed motor simultaneously with the stopping of the tool motor.

4. In a milling machine, the combination with a reciprocating work supporting table, of uprights, a cross-rail mounted on the uprights, a rotary tool carried by the cross-rail, an electric motor for driving said tool, an independent electric motor for driving the reciprocating work table, and intercontrolling means controlling said motors whereby the motor which operates the reciprocating table cannot function until the tool motor is started.

5. In a milling machine, the combination with a reciprocating work supporting table, of uprights, a cross-rail mounted on the uprights, a rotary tool mounted on the cross-rail, independent electric motors for operating the tool and the reciprocating work table, and means acting automatically to stop the motor which controls the reciprocating table simultaneously with the tool motor.

6. In a milling machine, the combination with a reciprocating work supporting table, of uprights, a cross-rail mounted on the uprights, a rotary tool mounted on the cross-rail, an electric motor for driving said tool, an independent electric motor for operating the reciprocating table, intercontrolling means controlling said motors whereby the motor which operates the reciprocating table cannot function until the tool motor is started, and means operating automatically to stop the feed motor simultaneously with the tool motor.

7. In a machine tool, the combination with a rotary tool and work feeding mechanism, of independent electric motors operating the tool and work feeding mechanism respectively, and intercontrolling means controlling said motors whereby the work feeding motor cannot operate until after the tool motor is started.

8. In a machine tool, the combination with a rotary tool and work feeding mechanism, of independent electric motors operating said tool and work feeding mechanism, and means acting automatically to stop the work feeding motor simultaneously with the stopping of the tool motor.

9. In a machine tool, the combination with a rotary tool and a work feeding mechanism, of independent electric motors operating the tool and work feeding mechanism respectively, intercontrolling means controlling said motors whereby the work feeding motor cannot operate until after the tool motor is started, and means acting automatically to stop the work feeding motor simultaneously with the stopping of the tool motor.

10. In a machine tool, the combination of a rotary tool, a work feeding mechanism, a motor for rotating said tool, a second motor for feeding the work, independently operable switches for controlling said motors, and means for breaking the circuit to the second motor when the circuit to the first motor is broken.

11. In a machine tool, the combination of a rotary tool, a motor for rotating said tool, a work feeding mechanism, a second motor for operating said work feeding mechanism, independently operable switches for said motors, and a circuit closer for the second motor operated by current directly in circuit to the first motor.

12. In a machine tool, the combination of a rotary tool, an electric motor therefor, a work feeding mechanism, a second electric motor therefor, and means for automatically breaking the circuit to the second motor when the current to the first motor is broken.

13. In a machine tool, the combination of a rotary tool, an electric motor therefor, a work feeding mechanism, a second electric motor therefor, independently operable switches for said motors, and independent means for breaking the circuit to the second motor when the circuit through the first motor is broken.

14. In a machine tool, the combination of a rotary tool, an electric motor for driving said tool, a work feeding mechanism, a second motor for said work feeding mechanism, and means dependent on the operation of the first motor for maintaining the circuit through the second motor.

15. In a machine tool, the combination of a rotary tool, an electric motor for driving said tool, a work feeding mechanism, a second motor for said work feeding mechanism, an automatic circuit breaker for said first mentioned motor, and means for stopping the second motor when said circuit breaker operates to stop the first motor.

In witness whereof, I have hereunto signed my name.

ALFRED TROSCH.